May 7, 1968
L. E. SMITH
3,381,980
PIPE JOINT
Filed Sept. 8, 1964
2 Sheets-Sheet 1
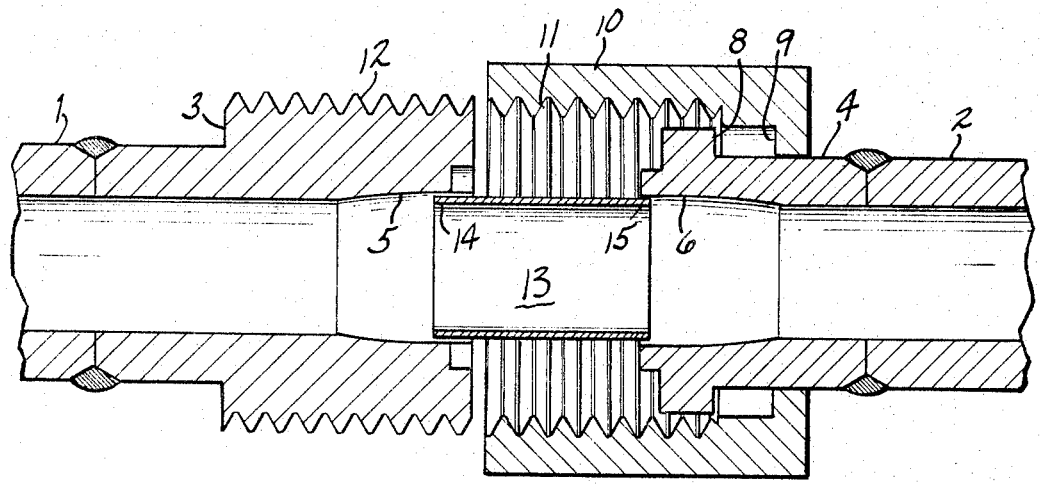
FIG-1
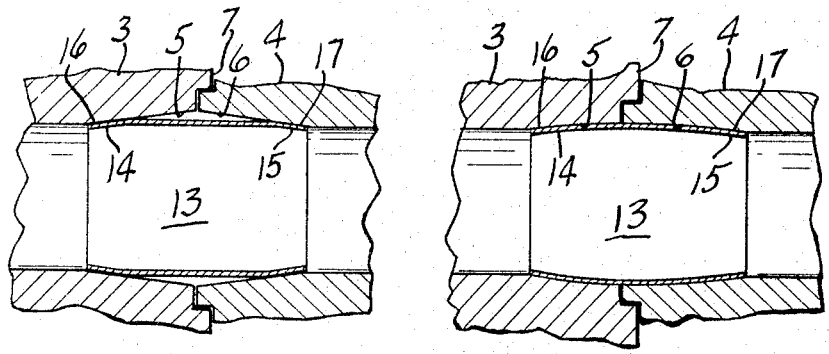
FIG-2
FIG-3
INVENTOR.
LESTER E. SMITH
BY
*Donald R. Motinko*
ATTORNEY May 7, 1968  L. E. SMITH  3,381,980
PIPE JOINT Filed Sept. 8, 1964  2 Sheets-Sheet 2

INVENTOR.
LESTER E. SMITH
BY
Donald R. Motsko
ATTORNEY

United States Patent Office 3,381,980
Patented May 7, 1968

3,381,980
PIPE JOINT
Lester E. Smith, Herrin, Ill., assignor to Olin Mathieson Chemical Corporation, a corporation of Virginia
Filed Sept. 8, 1964, Ser. No. 394,908
2 Claims. (Cl. 285—109)

This invention relates to a sealed joint or coupling for use in ducting to convey gases or liquids under both high and low operating temperatures and pressures.

Most seals for joints or couplings adapted for use under high pressure and temperature conditions currently in use depend upon the retention of material strength and upon no serious reduction in the modulus of elasticity as gas or liquid temperatures rise in order to retain a seal. The seal of this invention is a thin sleeve covering the inside of a butt joint which loses its strength to form a tighter seal as temperature and/or pressure rises in the system. An interference fit of the sleeve in the coupling provides an initial seal, but once the system is pressurized, gas or liquid pressure stretches the sleeve tight against the inside of the butt joint and holds it there in sealing engagement. As long as the sleeve does not get hot enough to melt and flow through the microscopic cracks at the joint, a tight seal is provided.

This invention will now be described in detail with reference to the accompanying drawings in which:

FIGURE 1 is a sectional side view of a joint formed with the novel sealing element of this invention prior to final assembly.

FIGURE 2 is a partial sectional side view of a joint formed with the novel sealing element of this invention in assembled condition, prior to the sleeve member being expanded into the final sealing condition.

FIGURE 3 is a partial sectional side view of the joint of this invention with the sleeve member in final sealing condition after the joint has been subjected to pressure and heat under operating condition.

Figure 4:
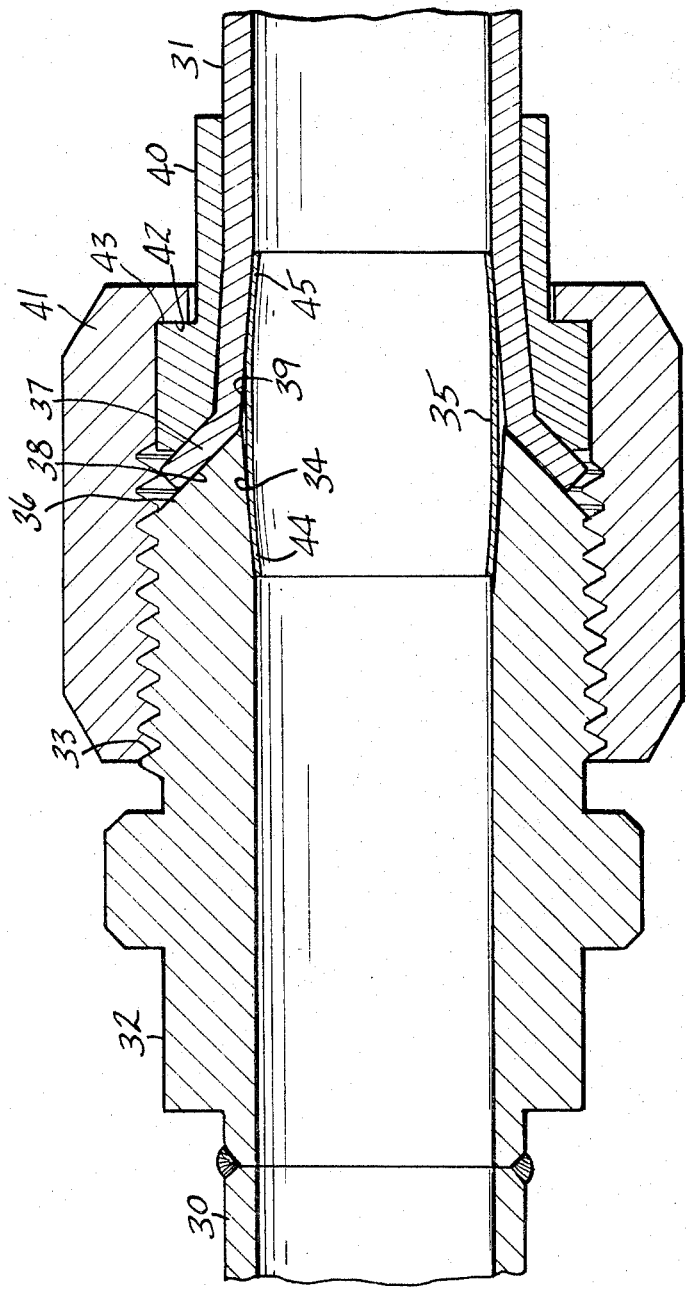
FIGURE 4 is a sectional side view of a modified embodiment of my invention utilizing the novel sealing element.

Referring now to FIGURES 1–3 of the drawings, I show two lengths of pipe 1 and 2 which are to be joined together. The lengths of pipe are provided with end members 3 and 4 respectively which may be formed integral with the pipe length or connected thereto by welding or the like. End members 3 and 4 are each provided with an outwardly flared conical inner surface 5 and 6 respectively. The end members 3 and 4 abut to provide a stepped joint 7 of shown in FIGURES 2 and 3. A shoulder 8 is provided on end member 4 which interlocks with a shoulder 9 formed on nut 10. Nut 10 is slidable over end member 4 and is provided with internal threads 11. The outer surface of end member 3 is also provided with threads 12. When nut 10 is threaded onto end member 3, the end members 3 and 4 are drawn into tight engagement. A cylindrical sleeve 13 is positioned inside end members 3 and 4 and bridges the joint 7. As the end members are drawn together by turning nut 10, the ends 14 and 15 of sleeve 13 are deformed inwardly to conform to the flared inner surfaces 5 and 6 of the end members 3 and 4 respectively as shown in FIGURE 2. This forms an initial seal at 16 and 17 as seen in FIGURE 2 between the sleeve 13 and the end members which is entirely adequate at normal temperatures. The sleeve 13 is formed of a relatively thin material, preferably metal, which is adapted to flow when subjected to high temperatures and pressures. When the sleeve 13 is subjected to high temperatures and pressures by hot gas or liquid flowing through the pipe joint, the seal 13 is greatly reduced in strength and the pressure in the joint forces the sleeve outwardly like a rubber sleeve to completely cover the joint 7 formed between the end members as clearly shown in FIGURE 3. This forms a final leakproof seal despite the high operating temperatures which will be maintained so long as the sleeve 13 does not become fluid enough to flow through joint 7.

While a metallic sleeve is preferred under high operating temperature and pressure conditions, this invention is not limited to the use of a metal sleeve. Any suitable material can be used for the sleeve which will not become liquid and flow through the joint under a given set of temperature and pressure conditions.

Referring now to FIGURE 4, I show another embodiment of my invention in which tubes or pipes 30 and 31 are connected together by a joint structure utilizing my novel sealing element.

Tube 30 is provided with an end member 32 which may be formed integral with the tube or connected thereto by welding or the like. End member 32 is provided with threads 33 formed on the outer surface thereof. A portion 34 of the inner surface of member 32 is tapered outwardly to accommodate seal member 35 in a manner described below. The inner end 36 of member 32 is tapered inwardly as shown.

Tube 31 is flared at 37 to cooperate with inner end 36 of tube 30 to form a sloping joint 38. Inwardly of the flared portion 37, a portion 39 at the inner surface of tube 31 is tapered outwardly to accommodate seal 35 in cooperation with tapered portion 34 of member 32.

A sleeve 40 surrounds tube 31 and has a portion 41 engaged against the flared portion 37. A nut 41 is threaded onto threads 33 of member 32. A shoulder 42 on nut 41 engages a cooperating shoulder 43 on sleeve 40 to complete the connection.

Seal member 35 is positioned inside the tapered portions 34 and 39 of tubes 30 and 31 as shown in the drawing. Seal 35 covers joint 38 and the end portions 44 and 45 of seal member 35 are squeezed inwardly by the tapered inner surfaces 34 and 39 to provide an initial seal between the end portions 44 and 45 of the seal 35 and the tube walls.

As pressure is applied to seal 35, it stretches and expands outwardly to completely cover and seal joint 38 in the manner described with reference to the FIGURE 1–3 embodiment.

While this invention has been described in detail with reference to a specific embodiment shown in the drawings, variations in design and structural detail are contemplated which are within the spirit and scope of the appended claims.

I claim:
1. A coupling comprising a first length of tubing having screw threads and a tapered portion at one end, a second length of tubing having a flared end portion engageable with said tapered portion to provide a sloping joint between said lengths of tubing, means maintaining said flared end portion and said tapered portion in contacting relationship, said first and second lengths of tubing each having an outwardly flared inner surface extending away from said joint, said flared inner surfaces meeting at said joint to define an apex, a thin metallic expansible seal member positioned in said lengths of tubing spanning said joint and having a wall thickness less than the wall thickness of said tubing, said seal member being cylindrical with a substantially constant internal and external diameter prior to said first and second tube members being in contacting relationship with the outer diameter of said seal member being greater than the unflared internal diameter of said tubing and less than the internal diameter of said tubing at said apex, the end portions of said seal member engaging the outwardly tapered surfaces of the internal surface along a portion of the length thereof due to the deformation thereof when said first and second lengths of tubing are drawn into contacting relationship, the outer surface of the intermediate portion of said seal member being spaced from the tapered surfaces adjacent said apex whereby said intermediate portion of said seal member can expand into contact with said tapered surfaces when subjected to increased temperatures and pressures.

2. The coupling of claim 1 wherein said means comprises a sleeve positioned about said second length of tubing having a tapered end in abutment with said flared end portion, a shoulder on said sleeve, a nut threadedly engaging the threaded outer surface of said first length of tubing and including an inwardly directed flange engaging said shoulder on said sleeve, said sleeve extending rearwardly away from said joint to a point axially rearward of said nut and said internal tapering surface of said second length of tubing.

References Cited

UNITED STATES PATENTS

| | | | |
|---|---|---|---|
| 610,321 | 9/1898 | Davey | 285—334.2 |
| 1,200,798 | 10/1916 | Bennett | 285—334.2 |
| 1,920,512 | 8/1933 | Lamont | 285—334.2 |
| 2,179,355 | 11/1939 | Scott | 285—109 |
| 2,340,732 | 2/1944 | Bruno | 285—331 |
| 2,463,407 | 3/1949 | Melton. | |
| 2,821,415 | 1/1958 | Race | 285—382.4 |
| 2,863,678 | 12/1958 | Gordon et al. | 285—332.2 |
| 3,058,750 | 9/1962 | Taylor. | |

FOREIGN PATENTS 169,081   1921   Great Britain.

EDWARD C. ALLEN, *Primary Examiner.*

CARL W. TOMLIN, *Examiner.*

W. L. SHEDD, T. A. LISLE, *Assistant Examiners.*